June 11, 1935.  J. A. GALLEY ET AL  2,004,573

PEA SHELLER

Filed Sept. 20, 1933

Inventors
John Alfred Galley and
Ernest Valentine Galley
By B. Singer, Atty.

Patented June 11, 1935

2,004,573

UNITED STATES PATENT OFFICE 2,004,573

PEA SHELLER

John Alfred Galley, Edgecliff, New South Wales, and Ernest Valentine Galley, Milsons Point, North Sydney, New South Wales, Australia Application September 20, 1933, Serial No. 690,272
In Australia March 31, 1933

3 Claims. (Cl. 130—30)

The object of this invention is to provide an improved and more simple device for the separation of peas from their pods, than has hitherto been devised. A pea-sheller according to this invention is of the type in which the full pods are rolled and spit open by progression between a series of endless bands and a fixed grid through which the separated peas fall, the empty pods being discharged from the end of the grid.

In the present invention simplicity and compactness combined with efficiency are aimed at, and these desiderata are obtained in a pea sheller as hereinafter described with reference to the accompanying drawing in which Fig. 1 is a perspective view of a complete machine according to a preferred embodiment of the invention.

Figure 1:
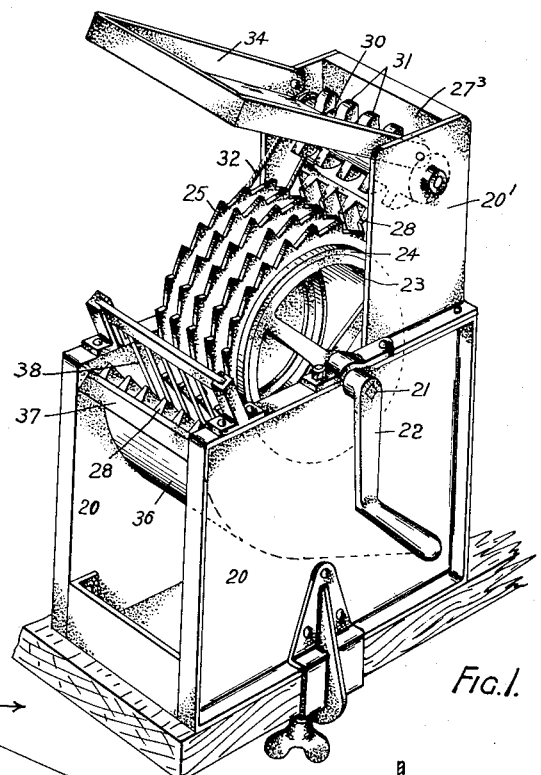

The operative parts of the machine are mounted on a frame comprising two parallel cheekplates 20, 20 on which is rotatably mounted a shaft or spindle 21 fitted at one end with a crankhandle 22. On the shaft is a drum 23 carrying on its periphery a tread or band 24 of rubber which is formed with a plurality of spaced circumferential ribs 25, 25. These ribs are notched or serrated on their edges as shown at 26.

Fitted in the frame and between the cheekplates is an arcuate shaped grid partially encompassing and spaced from the drum 24, said grid comprising solid end portions 27 and 27¹ with intermediate spaced bars 27² in register respectively with the spaces between the rubber ribs 25 of the band 24 on the drum 23, said bars having attached to them rubber strips 28 notched or serrated on their edges as shown at 29. The notches 29 are oppositely presented to those on the ribs 25.

Included in the complete machine is a feed device which is mounted in an upward extension 20¹ of the frame. This device comprises a roller 30 formed with spaced rows of spaced teeth 31, said roller being driven by means of an endless belt 32 from a pulley 33 on shaft 21.

A feed chute 34 is fitted to the frame extension 20¹ and is arranged with a downward inclination towards the roller 30. From the bottom of the chute 34 there extend a plurality of spaced fingers 35 registering with the spaces between the teeth 31 of roller 30, so that said teeth may pass between them as the roller 30 rotates. The fingers prevent pods from the chute 34 from falling through the space between the lower end of the bottom of the chute and the roller 30.

Figure 2:
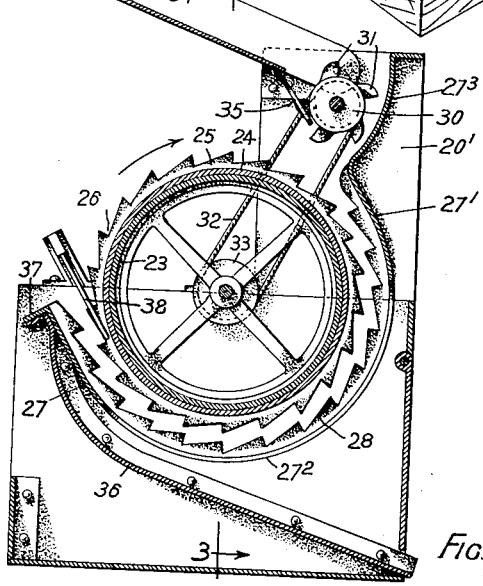
Fig. 2 is a sectional elevation thereof.
Figure 3:
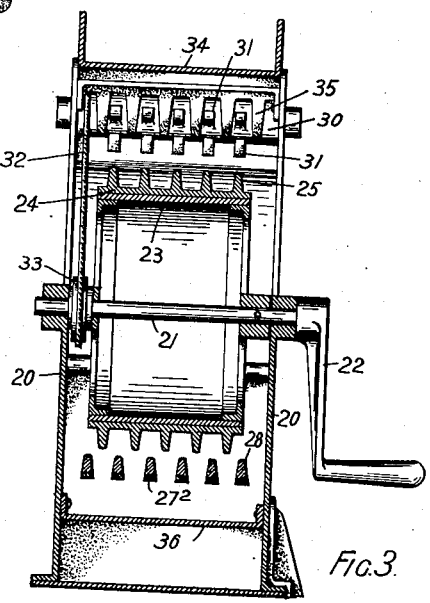
Fig. 3 is a cross sectional elevation on line 3, 3 of Fig. 2.

In operation, a quantity of full pods are deposited in the chute 34 and gravitates towards the roller 30. The crank handle 22 is then actuated to rotate the drum 23 in the direction shown by the arrow in Fig. 2, with consequential rotation of roller 30. The teeth of roller 30 pick up the pods singly and in transverse disposition and carry them successively over the roller whence they fall between the part 27³ and the roller and on to the circumferential ribs 25 on the drum. The notches on these ribs carry the pods into the space betwen themselves and the complementary strips 28 of the grid. During their progress the pods are rolled and split open so that detached peas fall between the bars 27² on to a receiving chute 36 whence they gravitate out of the machine. Meanwhile the emptied pods are further progressed and eventually discharged over the lip 37. To ensure that the empty pods or the peas do not stick to the ribs 25 there are provided a series of fingers 38 registering respectively with the spaces between the ribs 25. These fingers act as scrapers to remove matter which may otherwise adhere to the ribs 25.

We claim:

1. A pea-shelling device comprising a framing, a drum rotatably mounted in said framing, a plurality of spaced rubber ribs mounted annularly on the outer surface of said drum and each consisting of a separate endless rib located in a plane at right angles to the axis of the drum, a grid spaced from and arcuately disposed about said drum and comprising a plurality of separate parallel rubber bars registering respectively with the interspaces between said drum ribs, means for rotating said drum to cause a transverse rolling of pea-pods between, and along the length of, said bars and ribs, and a plurality of apertures between said bars to permit escape of peas removed from the pods.

2. A pea-shelling device comprising a framing, a drum rotatably mounted in said framing, means for rotating said drum, a plurality of spaced annular ribs mounted on the outer surface of said drum and each consisting of a separate endless rib located in a plane at right angles to the axis of said drum, teeth formed on said ribs which project in the operational direction of rotation of the drum, a grid spaced from and arcuately disposed about said drum and comprising a plurality of parallel separate rubber bars, registering respectively with the interspaces between the drum ribs. teeth formed on said bars which project oppositely to said rib-teeth, and apertures between said grid bars to permit escape of peas removed from pods positively rolled between said ribs and bars by the said oppositely disposed sets of teeth during rotation of the drum.

3. A pea-shelling device comprising, in combination, a frame having two spaced parallel cheek plates, a shaft rotatably mounted in said cheek plates and spanning the space between them, a drum fitted on said shaft and located between said cheek-plates, an endless band of rubber on the periphery of said drum, on said band a plurality of spaced circumferential ribs in parallel arrangement and having notched or serrated peripheral edges, means for rotating said shaft and drum, an arcuate-shaped grid underlying and partially encompassing said drum and band but spaced therefrom, said grid consisting of solid end portions supported by the frame and a plurality of spaced bars in parallel arrangement extending between said end portions, said bars registering respectively with the interspaces between the ribs on the drum, on said grid bars strips of resilient material with serrated inner edges, a pea-receiving chute underlying said grid, a plurality of fingers arranged tangentially to the drum and registering respectively with the spaces between the ribs thereon, said fingers serving as scrapers to remove matter adhering to the drum and ribs, and feeding means mounted above said drum in an upward extension of the frame, said feeding means comprising a feed-chute (to receive a quantity of full pods) and a rotatable feed-roller formed with longitudinal spaced rows of spaced teeth, said roller being geared to the shaft carrying the drum of the device, a guard consisting of a series of fingers attached to the feed chute at the end adjacent said roller, said fingers being tangential to the roller and registering respectively with the interspaces of the teeth thereon, said roller receiving pods successively from the feed chute and discharging them to fall on to the ribs on the drum.

JOHN ALFRED GALLEY.
ERNEST VALENTINE GALLEY.